United States Patent
Nakamura et al.

(10) Patent No.: US 11,421,126 B2
(45) Date of Patent: Aug. 23, 2022

(54) VINYL POLYMER MICROPARTICLES, AND MASTERBATCH AND RESIN FILM CONTAINING THE SAME

(71) Applicant: NIPPON SHOKUBAI CO., LTD., Osaka (JP)

(72) Inventors: Ryo Nakamura, Hyogo (JP); Yasutaka Nakatani, Hyogo (JP); Yoichi Igawa, Hyogo (JP); Erina Hanai, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 566 days.

(21) Appl. No.: 16/387,970

(22) Filed: Apr. 18, 2019

(65) Prior Publication Data
US 2019/0322782 A1 Oct. 24, 2019

(30) Foreign Application Priority Data
Apr. 20, 2018 (JP) .............................. JP2018-081730

(51) Int. Cl.
| C08J 5/14 | (2006.01) |
| C09D 123/04 | (2006.01) |
| C08F 220/14 | (2006.01) |
| C08J 3/22 | (2006.01) |
| C08J 5/18 | (2006.01) |
| C08F 220/28 | (2006.01) |

(52) U.S. Cl.
CPC .......... *C09D 123/04* (2013.01); *C08F 220/14* (2013.01); *C08F 220/282* (2020.02); *C08J 3/226* (2013.01); *C08J 5/18* (2013.01); *C08F 2500/24* (2013.01); *C08J 2333/10* (2013.01); *C08J 2333/14* (2013.01); *C08J 2423/12* (2013.01); *C08L 2310/00* (2013.01)

(58) Field of Classification Search
CPC ..... C08F 220/14; C08F 2500/24; C08J 3/225; C08J 5/18; C08J 2333/10; C08J 2333/14; C08J 2423/12; C08J 2323/12; C08J 2433/12; C09D 123/04; C08L 2310/00; C08L 33/10; B32B 27/08; B32B 27/308; B32B 27/32
USPC ....................................................... 523/351
See application file for complete search history.

(56) References Cited

U.S. PATENT DOCUMENTS

| 2003/0064237 A1* | 4/2003 | Oishi ................... C08F 220/12 428/500 |
| 2012/0136109 A1* | 5/2012 | Pafford, IV .......... C08F 220/18 524/522 |
| 2018/0171050 A1 | 6/2018 | Okochi et al. | |

FOREIGN PATENT DOCUMENTS

| CN | 104250325 | 12/2014 |
| EP | 2 783 678 | 10/2014 |
| EP | 3 305 816 | 4/2018 |
| JP | 2016-60753 | 4/2016 |
| JP | 2017-66362 | 4/2017 |
| WO | 2013/047687 | 4/2013 |
| WO | 2014/198797 | 10/2014 |
| WO | 2018/030461 | 2/2018 |

OTHER PUBLICATIONS

Office Action dated Jul. 2, 2020 in corresponding European Patent Application No. 19 170 188.7.
Tuziuti et al., "Effects of Sonication Conditions on Ultrasonic Dispersion of Inorganic Particles in Acrylic Resin", Japanese Journal of Applied Physics, Jul. 1, 2011, vol. 50, No. 7, pp. 078004.
Hielsher, T., "Ultrasonic Production of Nano-Size Dispersions and Emulsions", ENS'05 Paris, France, Dec. 14, 2005, pp. 138-143.
Hielscher, "Jun. 26, 2020 Ultrasonic dispersing and Deagglomeration, Hielscher-Ultrasound Technology Ultrasonic Dispersing and Deagglomeration", Jul. 1, 2014.
Notice of the Third Party Observation dated Feb. 3, 2021 in European Application No. 19170188.7.
European Office Action dated Feb. 16, 2021 in European Application No. 19170188.7.
Instruction manual for an FPIA-3000 flow particle image analyzer produced by Sysmex Corporation, Code No. 461-1145-1, Revised in Mar. 2005, with English translation.
Goncalves et al., "Effects of Operational Parameters on Particle Size Distributions in Methyl Methacrylate Suspension Polymerization", Industrial & Engineering Chemistry Research, vol. 50, No. 15, Aug. 3, 2011, pp. 9116-9122.
Sharma et al., "Tailoring the Particle Size Distribution in Suspension Polymerization of Poly (MMA-co-EGDMA): Role of Stabilizer and Agitation Rate", Macromolecular Symposia, vol. 376, No. 1, Dec. 1, 2017, p. 1600191 (5 pages).
Extended European Search Report dated Aug. 27, 2019 in corresponding European Patent Application No. 19170188.7.

(Continued)

*Primary Examiner* — Hannah J Pak
(74) *Attorney, Agent, or Firm* — Wenderoth, Lind & Ponack, L.L.P.

(57) ABSTRACT

Provided are vinyl polymer microparticle which can reduce an average volume of the microparticles dropping off from a film surface while reducing the friction of the film. The vinyl polymer microparticles satisfy the following (1) to (3):

(1) a coefficient of variation of particle sizes is 30% or more on a volume basis;

(2) a proportion of vinyl polymer microparticles having a particle size of 1.7 times or more and 2.5 times or less a volume average particle size is 0.040% or less on a number basis; and (3) a volume average particle size is 3.7 μm or more.

8 Claims, No Drawings

(56) References Cited

OTHER PUBLICATIONS

Communication pursuant to Rule 114(2) EPC dated Sep. 28, 2021 in corresponding European Patent Application No. 19170188.7.
Communication pursuant to Article 94(3) EPC dated Sep. 29, 2021 in corresponding European Patent Application No. 19170188.7.
Office Action dated Jan. 5, 2022, in corresponding Chinese Patent Application No. 201910322521.1, with machine English translation.
Notice of Third Party Observation issued Feb. 18, 2022, in corresponding Taiwanese Patent Application No. 108113760, with English translation, 39 pages.
Notice of Third Party Observation issued Mar. 15, 2022, in corresponding Japanese Patent Application No. 2019-078311, with English translation, 10 pages.
Communication pursuant to Rule 114(2) EPC dated Apr. 26, 2022 in corresponding European Patent Application No. 19170188.7, 63 pages.
Communication pursuant to Article 94(3) EPC dated May 30, 2022 in corresponding European Patent Application No. 19170188.7.
Notice of Third Party Observation issued May 31, 2022, in corresponding Japanese Patent Application No. 2019-078311, with English machine translation.

* cited by examiner

VINYL POLYMER MICROPARTICLES, AND MASTERBATCH AND RESIN FILM CONTAINING THE SAME

CROSS-REFERENCE TO RELATED APPLICATIONS

This application is related to and claims priority under 35 U.S.C. 119 to Japanese patent application No. 2018-081730, filed on Apr. 20, 2018 and Japanese patent application No. 2019-078311, filed on Apr. 17, 2019.

FIELD OF THE INVENTION

The present invention relates to vinyl polymer microparticles, and a masterbatch and a resin film containing the vinyl polymer microparticles.

BACKGROUND OF THE INVENTION

Resin films are widely used as various packaging materials. When the resin films are stored in a rolled state or in a stacked state, blocking of the films occurs, which may make the films difficult to slip or peel off. Anti-blocking agents have been used to prevent such blocking. In addition, when expressing only as a film in this specification, such expression refers to a resin film unless otherwise indicated.

As the anti-blocking agent, resin microparticles are widely used from the viewpoints of maintaining transparency of films and suppressing their scratching. For example, Patent Document 1 describes a laminated resin film including organic polymer microparticles in which a proportion of microparticles having a large particle size is reduced.

PRIOR ART DOCUMENT

Patent Document

Patent Document 1: WO 2018/030461

SUMMARY OF THE INVENTION

Problems to be Solved by the Invention

However, in the organic polymer microparticles described in Patent Document 1, there are few microparticles having an extremely large particle size, but microparticles having a relatively large particle size are considerably contained. While microparticles having a large particle size contribute to friction reduction, if the number of microparticles having a large particle size is large, an average volume of the microparticles dropping off from a film surface may become large. When microparticles having a large particle size drop off, dirt on the surface of a resin film may be noticeable and appearance of the film may be impaired. Therefore, it is required to reduce an average volume of such drop-off microparticles as much as possible.

Furthermore, in the organic polymer microparticles described in Patent Document 1, microparticles having a relatively large particle size may be reduced, but when such organic polymer microparticles are used as an anti-blocking agent, the resulting film was inferior in the appearance.

The present invention has been made in view of these circumstances, and an object thereof is to provide vinyl polymer microparticles which can have good film appearance by reducing an average volume of microparticles dropping off from the film surface while reducing the friction of the film.

Means for Solving the Problems

The present inventors have reduced a proportion of vinyl polymer microparticles having a particle size of 1.7 times or more and 2.5 times or less a volume average particle size, and by making the range of the volume average particle size of the microparticles be 3.7 µm or more, it is possible to make compatible the reduction of friction of the film and the suppression of dropping-off of large microparticles (suppression of contamination of the film surface), revealing that the appearance of the film can be improved. The present invention has been completed based on these findings.

The present invention includes the following inventions.

[1] Vinyl polymer microparticles that satisfy the following (1) to (3):
   (1) a coefficient of variation of particle sizes is 30% or more on a volume basis;
   (2) a proportion of vinyl polymer microparticles having a particle size of 1.7 times or more and 2.5 times or less a volume average particle size is 0.040% or less on a number basis; and
   (3) a volume average particle size is 3.7 µm or more.

[2] The vinyl polymer microparticles according to the above [1], comprising a copolymer of a (meth)acrylic monofunctional monomer and a (meth)acrylic difunctional crosslinkable monomer.

[3] The vinyl polymer microparticles according to the above [2], wherein the (meth)acrylic monofunctional monomer is a $C_{1-4}$ alkyl (meth)acrylate, and the (meth)acrylic difunctional crosslinkable monomer is an alkanediol di(meth)acrylate.

[4] The vinyl polymer microparticles according to the above [1], wherein a residual amount of the (meth)acrylic monomer is 700 ppm or less.

[5] A masterbatch comprising the vinyl polymer microparticles according to the above [1] and a resin.

[6] The masterbatch according to the above [5], wherein the resin is a polyolefin resin.

[7] A resin film comprising the vinyl polymer microparticles according to the above [1] and a resin.

[8] The resin film according to the above [7], wherein a content of the vinyl polymer microparticles is 0.01% by mass or more and 10% by mass or less.

[9] The resin film according to the above [7], having a thickness of 0.1 µm or more and 1 mm or less.

Effect of the Invention

According to the present invention, by setting a proportion of the vinyl polymer microparticles having a particle size of 1.7 times or more and 2.5 times or less a volume average particle size to 0.040% or less on a number basis, an average volume of the microparticles dropping off from a film surface can be reduced while reducing the friction of the film. Moreover, by preventing a volume average particle size of polymer microparticles from becoming less than 3.7 µm as well as maintaining the proportion of microparticles described above, it is possible to reliably suppress deterioration external appearance of a film. In addition, in this specification, the vinyl polymer microparticles may only be referred to as "microparticles". Further, in the present specification, even when there is a simple statement of "particle size", it refers to a particle size measured on a volume basis.

Mode for Carrying Out the Invention

1. Vinyl Polymer Microparticles

The vinyl polymer constituting the microparticles of the present invention is preferably a homopolymer or copolymer of a vinyl compound such as (meth)acrylic monomers and styrenic monomers and is more preferably a homopolymer or copolymer of (meth)acrylic monomers. The homopolymer or copolymer of a (meth)acrylic monomer is preferably a homopolymer or copolymer containing any one or more of a (meth)acrylic monofunctional monomer and a (meth)acrylic polyfunctional crosslinkable monomer. A copolymer of a (meth)acrylic monofunctional monomer and a (meth)acrylic polyfunctional crosslinkable monomer is more preferable. A copolymer of a (meth)acrylic monofunctional monomer and a (meth)acrylic difunctional crosslinkable monomer is most preferable.

The styrenic monomer may be used singly or in combination of two or more thereof and may be a non-crosslinkable styrenic monomer or a crosslinkable styrenic monomer. Examples of the non-crosslinkable styrenic monomers include styrene, o-methylstyrene, m-methylstyrene, p-methylstyrene, a-methylstyrene, p-methoxystyrene, p-tert-butylstyrene, p-phenylstyrene, o-chlorostyrene, m-chlorostyrene, p-chlorostyrene, ethylvinylbenzene, and the like. The crosslinkable styrenic monomer may be a styrenic monomer having two or more polymerizable functional groups, and examples of such a polymerizable functional group include a vinyl group, a (meth)acryloyl group, etc., and among which, a vinyl group is preferred. Examples of the crosslinkable styrenic monomer include aromatic divinyl compounds such as m-divinylbenzene, p-divinylbenzene, divinylnaphthalene, and derivatives thereof.

As the (meth)acrylic monofunctional monomer, one or more kinds thereof can be used. For example, there are exemplified (meth)acrylic acid; monoalkyl (meth)acrylates (e.g. methyl (meth)acrylate, ethyl (meth)acrylate, propyl (meth)acrylate, n-butyl (meth)acrylate, isobutyl (meth)acrylate, t-butyl (meth)acrylate, octyl (meth)acrylate, 2-ethylhexyl (meth)acrylate, dodecyl (meth)acrylate, stearyl (meth)acrylate, etc.); acrylates containing a monocyclic ether, such as tetrahydrofurfuryl (meth)acrylate; and the like. The (meth)acrylic monofunctional monomer is preferably a monoalkyl (meth)acrylate, more preferably an ester of (meth)acrylic acid and an alkyl alcohol having 1 to 4 carbon atoms (that is, $C_{1-4}$ alkyl (meth)acrylate), particularly preferably methyl (meth)acrylate, and most preferably methyl methacrylate. The (meth)acrylic monofunctional monomer may be either an acrylic monofunctional monomer or a methacrylic monofunctional monomer, but a methacrylic monofunctional monomer is preferred.

As the (meth)acrylic difunctional crosslinkable monomer, one or more kinds thereof can be used. For example, there are exemplified alkanediol di(meth)acrylates such as ethylene glycol di(meth)acrylate, 1,4-butanediol di(meth)acrylate, 1,6-hexanediol di(meth)acrylate and 1,9-nonanediol di(meth)acrylate; alkene di(meth)acrylates such as 1,3-butylene di(meth)acrylate; polyalkylene glycol di(meth)acrylates such as polyethylene glycol di(meth)acrylate; and the like. A repeating number of the alkylene glycol unit of a polyalkylene glycol di(meth)acrylate is, for example, preferably 2 to 150, more preferably 2 to 23, still more preferably 2 to 5, and most preferably 2 or 3. The smaller the number of repeating alkylene glycol units, the lower the melting point, so that the (meth)acrylic difunctional crosslinkable monomer becomes liquid even at room temperature, resulting in an improvement of handling property.

Among them, as the (meth)acrylic difunctional crosslinkable monomer, an alkanediol di(meth)acrylate is preferred; an alkanediol (meth)acrylate composed of two (meth)acrylic acids and one alkanediol having 2 to 4 carbon atoms is more preferred; ethylene glycol di(meth)acrylate is particularly preferred; and ethylene glycol dimethacrylate is most preferred.

Examples of the (meth)acrylic difunctional crosslinkable monomer used for the preparation of a copolymer of the (meth)acrylic monofunctional monomer and the (meth)acrylic difunctional crosslinkable monomer may include a monomer having two polymerizable functional groups copolymerizable with a (meth)acrylic monomer. Such a polymerizable functional group includes a vinyl group, a (meth)acryloyl group, etc., and of these, a (meth)acryloyl group is preferable and a methacryloyl group is particularly preferred. However, at least one of the polymerizable functional groups is a (meth)acryloyl group.

When the polymer contains a copolymer of a (meth)acrylic monofunctional monomer and a (meth)acrylic difunctional crosslinkable monomer, the amount of the (meth)acrylic difunctional crosslinkable monomer is, for example, 5 parts by mass or more, preferably 10 parts by mass or more, still more preferably 15 parts by mass or more, with respect to a total of 100 parts by mass of the (meth)acrylic monofunctional monomer and the (meth)acrylic difunctional crosslinkable monomer. Also, the amount of the (meth)acrylic difunctional crosslinkable monomer is, for example, 35 parts by mass or less, preferably 30 parts by mass or less, more preferably 25 parts by mass or less. When the proportion of the (meth)acrylic difunctional crosslinkable monomer is used in a predetermined amount or more, hardness of the vinyl polymer microparticles can be secured and usefulness as an anti-blocking agent can be enhanced. In addition, quantitative relationship between these monomers is maintained also in quantitative relationship between constituent units derived from each monomer in a copolymer after copolymerization. Moreover, the point that the quantitative relationship between raw material monomers is also maintained in the quantitative relationship between constituent units of the copolymer obtained from the raw material monomers is the same as in the other copolymers described in the following paragraphs.

When the polymer contains a copolymer of a (meth)acrylic monofunctional monomer and a (meth)acrylic difunctional crosslinkable monomer, the total amount of the (meth)acrylic monofunctional monomer and the (meth)acrylic difunctional crosslinkable monomer is, for example, 60 parts by mass or more, preferably 80 parts by mass or more, still more preferably 90 parts by mass or more, and may be 100 parts by mass, with respect to 100 parts by mass of all the monomer components constituting the vinyl polymer microparticles (copolymer).

When the polymer contains a copolymer of a (meth)acrylic monofunctional monomer and a (meth)acrylic difunctional crosslinkable monomer, other monomer-derived units copolymerizable with the (meth)acrylic monomer may be contained. As the other monomers, one or more kinds thereof can be used, including, for example, the styrenic monomers; aromatic divinyl compounds (e.g. m-divinylbenzene, p-divinylbenzene, divinylnaphthalene and derivatives thereof), crosslinking agents (e.g. N,N-divinyl aniline, divinyl ether, divinyl sulfide, divinyl sulfonic acid, etc.), polybutadiene, and reactive polymers described in JP-B-57-56507, JP-A-59-221304, JP-A-59-221305, JP-A-59-221306, JP-A-59-221307, and the like. The amount of the unit derived from the other monomer is preferably 30% by mass or less, more preferably 20% by mass or less, still more preferably 10% by mass or less, even still more preferably 5% by mass or less, particularly preferably 2% by mass or less, and most preferably 0% by mass, in the vinyl polymer microparticles.

Further, in the present invention, as the crosslinkable monomer, a monomer other than the (meth)acrylic difunctional crosslinkable monomer may be used. As such a crosslinkable monomer, one or more kinds thereof can be used, including trifunctional or higher (meth)acrylic polyfunctional monomers, such as tetrafunctional (meth) acrylic monomers (e.g. pentaerythritol tetra(meth)acrylate, etc.) and hexafunctional (meth)acrylic monomers (e.g. dipentaerythritol hexa(meth)acrylate, etc.).

The proportion of vinyl polymer microparticles having a particle size of 1.7 times or more and 2.5 times or less a volume average particle size is 0.040% or less on a number basis, preferably 0.030% or less, and more preferably 0.025% or less. The proportion of the vinyl polymer microparticles having a particle size of 1.7 times or more and 2.5 times or less a volume average particle size affects an average volume of the microparticles dropping off from a film surface, and by reducing the proportion of the vinyl polymer microparticles having such a particle size, the average volume of the vinyl polymer microparticles dropping off from the film surface can be reduced. Although the method of measuring a proportion of the vinyl polymer microparticles having a particle size of 1.7 times or more and 2.5 times or less a volume average particle size will be described later, in the present specification, "a proportion of the vinyl polymer microparticles having a particle size of 1.7 times or more and 2.5 times or less a volume average particle size" means the number expressed in terms of a percentage of vinyl polymer microparticles having a particle size of 1.7 times or more and 2.5 times or less a volume average particle size relative to 1,000,000 vinyl polymer microparticles.

The vinyl polymer microparticles have a volume average particle size of 3.7 µm or more. Even if a proportion of the vinyl polymer microparticles having a particle size of 1.7 times or more and 2.5 times or less a volume average particle size can be in the above range, the appearance of the film is inferior when the volume average particle size itself is small. By achieving both of setting the proportion of the vinyl polymer microparticles having a particle size of 1.7 times or more and 2.5 times or less a volume average particle size in a predetermined range and setting the volume average particle size in a predetermined range, the appearance of the film can be reliably improved. The volume average particle size is preferably 3.8 µm or more, and more preferably 3.9 µm or more. Further, the volume average particle size is preferably 10.0 µm or less, more preferably 8.0 µm or less, still more preferably 6.0 µm or less, particularly preferably 5.5 µm or less, and most preferably 5.0 µm or less. The measuring method of a volume average particle size is mentioned later. In order to set the volume average particle size of the particles to 3.7 µm or more, such particles are preferably produced by suspension polymerization method. In the emulsion polymerization method, it is technically difficult to synthesize microparticles of 1 µm or more, and it is usually difficult to take out the microparticles from the polymerization solution because microparticles having a small particle size of about several tens of nm to several hundreds of nm are synthesized.

A coefficient of variation (CV value) of the particle size of the vinyl polymer microparticles is a value determined from the particle size distribution on a volume basis, and is 30% or more, preferably 33% or more. The microparticles having a coefficient of variation of less than 30% require production by, for example, an emulsion polymerization method, but as described above, when the emulsion polymerization method is used, it becomes difficult to take out the microparticles from the polymerization solution. On the other hand, microparticles having a coefficient of variation of 30% or more can be produced by suspension polymerization method, and the microparticles are easily taken out. Such particles having a large coefficient of variation necessarily have a large content of coarse particles, but in the vinyl polymer microparticle of the present invention, the proportion of vinyl polymer microparticles having a particle size of 1.7 times or more and 2.5 times or less a volume average particle size is reduced. Such vinyl polymer microparticles satisfying the seemingly contradictory relationship can be produced, for example, according to a predetermined production method described later. In addition, it is difficult to selectively remove only vinyl polymer microparticles having a particle size of 1.7 times or more and 2.5 times or less a volume average particle size simply by classification. If classification is carried out to set the proportion of vinyl polymer microparticles having a particle size of 1.7 times or more and 2.5 times or less a volume average particle size, to 0.040% or less on a number basis, a large number of vinyl polymer microparticles which do not need to be removed (vinyl polymer microparticles outside the range of a particle size of 1.7 times or more and 2.5 times or less a volume average particle size) are also removed by classification. Thus, since the yield is significantly reduced, such classification is not practical in terms of cost. The upper limit of the coefficient of variation is not particularly limited, and is, for example, 50% or less, preferably 45% or less, and more preferably 40% or less. The method of measuring the coefficient of variation will be described later. In the present specification, the "coefficient of variation of particle size" means a coefficient of variation of particle sizes of vinyl polymer microparticles including not only microparticles having a particle size of 1.7 times or more and 2.5 times or less a volume average particle size, but also microparticles which are out of the range of a particle size of 1.7 times or more and 2.5 times or less a volume average particle size.

A residual amount of the (meth)acrylic monomer in the vinyl polymer microparticles is preferably 700 ppm or less, more preferably 500 ppm or less, still more preferably 300 ppm or less, particularly preferably 100 ppm or less, and most preferably 50 ppm or less. By setting the residual amount of the (meth)acrylic monomer to 700 ppm or less, hydrophobicity of the vinyl polymer microparticles can be appropriately increased. When the hydrophobicity of the vinyl polymer microparticles is made appropriate, it is possible to more reliably prevent large cavities (voids) formed when the vinyl polymer microparticles drop off from the resin film, and to further improve the appearance of the resin film. In particular, when an unstretched film is produced using a resin composition containing vinyl polymer microparticles and the unstretched film is stretched, voids are likely to be formed around the vinyl polymer microparticles. When the residual amount of the (meth)acrylic monomer in the vinyl polymer microparticles is large, hydrophobicity of the vinyl polymer microparticles is lowered, and affinity between the vinyl polymer microparticles and the resin forming the film is lowered. As a result, the voids formed around the vinyl polymer microparticles become large, and the voids when the vinyl polymer microparticles drop off may also become large.

The hydrophobicity of the vinyl polymer microparticles can be evaluated by the time (sedimentation start time) until sedimentation of the vinyl polymer microparticles starts, and the longer the sedimentation start time, the larger the hydrophobicity. The hydrophobicity (sedimentation start time) of the vinyl polymer microparticles is, for example, 16 seconds or more, preferably 30 seconds or more, and more preferably 60 seconds or more. When the hydrophobicity is high, large cavities (voids) formed when the vinyl polymer microparticles drop off from the resin film can be prevented more reliably, and the appearance of the resin film can be further improved.

More specifically, the determination of the sedimentation start time is carried out according to the procedure described in examples.

A value obtained by dividing the number of vinyl polymer microparticles having a particle size of 1.7 times or more and 2.5 times or less a volume average particle size in 1,000,000 vinyl polymer microparticles by the volume average particle size is preferably 60 particles/µm or less, more preferably 55 particles/µm or less, still more preferably 50 particles/µm or less, and particularly preferably 45 particles/µm or less. When the value is 60 particles/µm or less, the average volume of the microparticles dropping off from the film surface can be further reduced and the stain on the resin film surface can be made less noticeable, so that the film appearance can be further improved. Further, by setting the value to 60 particles/µm or less, particles which do not play a role as an anti-blocking agent (the blocking between films cannot be sufficiently prevented) can be reduced, and the anti-blocking property can be further enhanced.

A value obtained by dividing the number of vinyl polymer microparticles having a particle size of 1.7 times or more and 2.5 times or less a volume average particle size in 1,000,000 vinyl polymer microparticles, by the volume per drop-off particle is preferably 6.0 particles/µm$^3$ or less, more preferably 5.5 particles/µm$^3$ or less, and still more preferably 5.0 particles/µm$^3$ or less. When the value is 6.0 particles/µm$^3$ or less, the average volume of the microparticles dropping off from a film surface can be made smaller, and stain of the resin film surface can be made less noticeable, so that film appearance can be improved further. Further, by setting the value to 6.0 particles/µm$^3$ or less, particles which do not play a role as an anti-blocking agent (the blocking between films cannot be sufficiently prevented) can be reduced, and anti-blocking properties can be further enhanced.

Furthermore, the vinyl polymer microparticles of the present invention are preferably not classified. The vinyl polymer microparticles of the present invention can also be produced by a simple method in which classification is omitted. When the particle size distribution of vinyl polymer microparticles is measured with the particle size taken as a horizontal axis and the frequency taken as a vertical axis, whether the microparticles are classified or not can be judged according to the presence or absence of a sharp reduction part where the frequency sharply decreases at the boundary of the prescribed particle size.

2. Method for Producing Vinyl Polymer Microparticles

The vinyl polymer microparticles can be produced by polymerizing the above-mentioned monomers. The polymerization of the monomers is usually carried out in an aqueous solvent in the presence of a dispersion stabilizer and is preferably prepared by a suspension polymerization method. According to these polymerization methods, it is possible to make the vinyl polymer microparticles spherical and to obtain vinyl polymer microparticles of uniform particle size. For example, in the suspension polymerization method, a monomer suspension can be obtained by dispersing and suspending a monomer for forming vinyl polymer microparticles, a polymerization initiator, a dispersion stabilizer (surfactant), and an aqueous solvent. By polymerizing the monomer in the obtained monomer suspension, a suspension of vinyl polymer microparticles can be obtained.

<Dispersion Stabilizer>

The dispersion stabilizer may be either an organic dispersion stabilizer or an inorganic dispersion stabilizer. Examples of the organic dispersion stabilizer include water-soluble polymers, anionic surfactants, cationic surfactants, nonionic surfactants, amphoteric surfactants, alginic acid salts, zein, casein, and the like. Examples of the inorganic dispersion stabilizer include barium sulfate, calcium sulfate, barium carbonate, magnesium carbonate, calcium phosphate, talc, clay, diatomaceous earth, bentonite, titanium hydroxide, sodium hydroxide, metal oxide powder, and the like.

Examples of the water-soluble polymer include water soluble polymers such as polyvinyl alcohol, gelatin, tragacanth, starch, methyl cellulose, carboxymethyl cellulose, hydroxyethyl cellulose, sodium polyacrylate, sodium polymethacrylate, and the like.

Examples of the anionic surfactant include fatty acid salts such as sodium oleate and castor oil potassium; alkyl sulfate ester salts such as sodium lauryl sulfate and ammonium lauryl sulfate; alkylbenzenesulfonic acid salts such as sodium dodecylbenzenesulfonate; alkylnaphthalene sulfonic acid salts; alkanesulfonic acid salts; dialkylsulfosuccinic acid salts; alkylphosphoric ester salts; naphthalenesulfonic acid-formalin condensates; polyoxyalkylene alkyl ether sulfuric acid salts such as polyoxyethylene alkyl ether sulfuric acid salt; polyoxyalkylene aryl ether sulfuric acid ester salts such as polyoxyethylene phenyl ether sulfuric acid ester salts; and polyoxyalkylene alkyl sulfuric acid ester salts such as polyoxyethylene alkyl sulfuric acid ester salts.

Examples of the cationic surfactant include alkylamine salts such as laurylamine acetate and stearylamine acetate; and quaternary ammonium salts such as lauryltrimethylalkyl ammonium chloride.

Examples of the nonionic surfactant include polyoxyethylene alkyl ether, polyoxyethylene alkyl phenyl ether, polyoxyethylene sorbitan fatty acid ester, sorbitan fatty acid ester, polyoxysorbitan fatty acid ester, polyoxyethylene alkylamine, glycerin fatty acid esters, oxyethylene-oxypropylene block copolymers, and the like.

As an amphoteric surfactant, for example, a lauryl dimethyl amine oxide etc. are mentioned.

Among them, from the viewpoints of good polymerization stability and suspension stability, the dispersion stabilizer is preferably an organic dispersion stabilizer, more preferably an anionic surfactant, still more preferably polyoxyalkylene aryl ether sulfuric acid ester salt, most preferably polyoxyethylene distyryl phenyl ether sulfuric acid ester ammonium salt.

The dispersion stabilizer is preferably 0.1 parts by mass or more, more preferably 0.5 parts by mass or more, and preferably 5 parts by mass or less, more preferably 3 parts by mass or less, still more preferably 2 parts by mass or less, with respect to 100 parts by mass of the total amount of monomers.

<Polymerization Initiator>

The polymerization initiator is preferably a thermal polymerization initiator, and it is more preferable to use a polymerization initiator (B) having a 10-hour half-life temperature of 40° C. or more in combination with a polymerization initiator (A) having a 10-hour half-life temperature of 3° C. or more (preferably 15° C. or less, more preferably 10° C. or less) higher than that of the polymerization initiator (B). When an initial radical generation rate is high in a suspension polymerization, the polymerization proceeds faster, while some monomers are left, and the remaining monomers are left in contact with a radical generator by the produced polymer, so the monomers were easy to remain. In addition, even when the initial radical generation rate is low, the monomer tends to remain, and there was a possibility that the microparticles generate an odor. By combining two types of polymerization initiators (A) and (B) each having a different 10-hour half-life temperature, the reaction rate can be maintained at a constant rate or more from the initial stage to the final stage of the reaction, so that generation of odor from the microparticles can be suppressed.

The term "10-hour half-life temperature" means a temperature at which the time taken for the polymerization initiator to be decomposed to become 1/2 is 10 hours and can be determined by examining the decomposition rate at a predetermined temperature in a solution in which a polymerization initiator is dissolved in an inert solvent (for example, benzene) at a concentration of 0.10 mol/L. When the polymerization initiator does not dissolve in benzene at a concentration of 0.10 mol/L, such a concentration may be 0.05 mol/L. When the polymerization initiator does not dissolve in benzene at a concentration of 0.05 mol/L, the solvent to be used may be toluene. Furthermore, when the measurement cannot be performed by these concentrations and solvents, a suitable solvent may be appropriately selected.

Specifically, a large number of samples in which the decomposition rate measurement sample is enclosed in a nitrogen-substituted glass tube are prepared, the glass tube is maintained at a predetermined half-life measurement temperature and removed at predetermined intervals. The concentration of the polymerization initiator in the contents is measured to determine the half-life at the measurement temperature. The concentration of the polymerization initiator can be determined using high performance liquid chromatography (HPLC), and if the HPLC is inadequate as a concentration measurement system, such as insufficient separation of the decomposition product peak and the measurement product peak, gas chromatography (GC) may be used, and the half-life may be determined by recording the time change of an active oxygen concentration in a peroxide type polymerization initiator when HPLC and GC are inadequate. An iodometric titration method can be employed to determine the active oxygen concentration.

The 10-hour half-life temperature can be determined by plotting the half-life measurement results at a plurality of (3 or more points) half-life measurement temperatures (however, each half-life measurement temperature is set at every about 5° C., and the 10-hour half-life temperature is included below the upper limit and above the lower limit) on a semi-logarithmic graph.

The polymerization initiator (A) and the polymerization initiator (B) have different 10-hour half-life temperatures by 3° C. or more (preferably 15° C. or less, more preferably 10° C. or less), and various polymerization initiators can be appropriately used in combination as long as the conditions for the 10-hour half-life temperature of the initiator having a lower half-life temperature (that is, the initiator (B)) to be 40° C. or more are satisfied. For example, the polymerization initiator (A) and the polymerization initiator (B) can be appropriately selected from peroxide type polymerization initiators, azo compound type polymerization initiators and the like, and of these, peroxide type polymerization initiators are preferable. Such peroxide type polymerization initiators include peroxides having a structure of —C(O) OOC(O)—, such as benzoyl peroxide (10-hour half-life temperature 74° C.), diacyl peroxide type initiators (e.g. dilauroyl peroxide (10-hour half-life temperature 62° C.), dioctanoyl peroxide, bis(orthochlorobenzoyl) peroxides, bis(orthomethoxybenzoyl) peroxide, etc.), and peroxydicarbonate type initiators (e.g. diisopropyl peroxydicarbonate, etc.); peroxides having a structure of —OO—C—OO— or —OOC(=O), such as dimerized ketone type initiator (e.g. methyl ethyl ketone peroxide, etc.), peroxyacetal type initiators (e.g. cyclohexanone peroxide, etc.), peroxyketal type initiators 1,1-di(t-hexylperoxy)cyclohexane (trade name: PERHEXA HC (registered trademark)), and alkyl peroxy ester type initiators (e.g. t-hexylperoxy-2-ethylhexanoate (trade name: PERHEXYL O (registered trademark)) (10-hour half-life temperature 70° C.), 1,1,3,3-tetramethylbutoxyperoxy-2-ethylhexanoate (trade name: PEROCTA O (registered trademark) (10-hour half-life temperature 65° C.) peroxides having a structure of —COOH (hydroperoxide type initiators), such as cumene hydroperoxide (10-hour half-life temperature 158° C.), t-butyl hydroperoxide, and diisopropylbenzene hydroperoxide; and the like. Among them, it is particularly preferable to use dilauroyl peroxide in combination with t-hexylperoxy-2-ethylhexanoate as a polymerization initiator.

Further, as the azo compound type polymerization initiator, there are exemplified 2,2'-azobisisobutyronitrile, 2,2'-azobis(2,4-dimethylvaleronitrile), 2,2'-azobis(2,3-dimethylbutyronitrile), 2,2'-azobis-(2-methylbutyronitrile), 2,2'-azobis(2,3,3-trimethylbutyronitrile), 2,2'-azobis(2-isopropylbutyronitrile), 1,1'-azobis(cyclohexane-1-carbonitrile), 2,2'-azobis(4-methoxy-2,4-dimethylvaleronitrile), 2-(carbamoylazo)isobutyronitrile, 4,4'-azobis(4-cyanovaleric acid), dimethyl-2,2'-azobisisobutyrate and the like.

The 10-hour half-life temperature of the polymerization initiator (A) is preferably 55° C. or more, more preferably 60° C. or more, particularly preferably 63° C. or more, and preferably 100° C. or less, more preferably 85° C. or less, particularly preferably 75° C. or less. The polymerization initiator (A) is preferably a peroxide having a structure of —OO—C—OO— or —OOC(=O)—, particularly an alkyl peroxy ester type initiator, and more preferably t-hexylperoxy-2-ethylhexanoate.

The 10-hour half-life temperature of the polymerization initiator (B) is preferably 50° C. or more, more preferably 55° C. or more, and preferably 75° C. or less, more preferably 70° C. or less, particularly preferably 65° C. or less. The polymerization initiator (B) is preferably a peroxide having a structure of —C(O)OOC (O)—, particularly a diacyl peroxide type initiator, and more preferably dilauroyl peroxide.

The mass ratio of the polymerization initiator (A) to the polymerization initiator (B) (polymerization initiator (A) (polymerization initiator (B)) is preferably 0.1 or more, more preferably 0.2 or more, still more preferably 0.3 or more, particularly preferably 0.35 or more, and preferably 0.9 or less, more preferably 0.85 or less, still more preferably 0.75 or less, particularly preferably 0.65 or less.

The total of the polymerization initiator (A) and the polymerization initiator (B) is, for example, preferably 1.5 parts by mass or more and more preferably 1.7 parts by mass or more, with respect to a total of 100 parts by mass of the (meth)acrylic monomer and the (meth)acrylic difunctional crosslinkable monomer. The residual amount of the (meth)acrylic monomer can be reduced by setting the total of the polymerization initiator (A) and the polymerization initiator (B) to 1.5 parts by mass or more. The total of the polymerization initiator (A) and the polymerization initiator (B) is preferably 4 parts by mass or less, more preferably 3.5 parts by mass or less, and particularly preferably 3 parts by mass or less, with respect to 100 parts by mass of the total of the (meth)acrylic monomer and the (meth)acrylic difunctional crosslinkable monomer.

The content of the polymerization initiator (B) is 1.2 parts by mass or more, more preferably 1.5 parts by mass or more, still more preferably 1.7 parts by mass or more, and particularly preferably 1.9 parts by mass or more, with respect to the total of 100 parts by mass of the (meth)acrylic monomer and the (meth)acrylic difunctional crosslinkable monomer. The residual amount of the (meth)acrylic monomer can be reduced by setting the content of the polymerization initiator (B) to 1.2 parts by mass or more. The content of the polymerization initiator (B) is preferably 3.5 parts by mass or less, more preferably 3 parts by mass or less, particularly preferably 2.5 parts by mass or less, and still particularly preferably 2 parts by mass or less, with respect to 100 parts by mass of the total of the (meth)acrylic monomer and the (meth)acrylic difunctional crosslinkable monomer.

<Aqueous Type Solvent>

The aqueous type solvent may contain at least water, and may be, for example, water alone, or may be a combination of water and a water-soluble solvent. By using a water-soluble organic solvent, the particle size of the resulting particles can be controlled.

The amount of water is, for example, 80 parts by mass or more, preferably 90 parts by mass or more, more preferably 95 parts by mass or more, and particularly preferably 99 parts by mass or more, in 100 parts by mass of the aqueous solvent. It is preferable from the viewpoint of suspension stability to contain a sufficient amount of water.

Examples of the water-soluble organic solvent include alcohol solvents such as methanol, ethanol, propanol, butanol, 2-methylpropyl alcohol and 2-methyl-2-propanol; ketone solvents such as acetone and methyl ethyl ketone; ester solvents such as ethyl acetate; ether solvents such as dioxane, diethyl ether, and tetrahydrofuran; and the like.

The aqueous type solvent is preferably 100 parts by mass or more, more preferably 200 parts by mass or more, still more preferably 300 parts by mass or more, and preferably 1000 parts by mass or less, more preferably 700 parts by mass or less, still more preferably 500 parts by mass or less, with respect to 100 parts by mass of a non-aqueous solvent component (a component obtained by removing an aqueous solvent from a monomer reaction solution).

<Antioxidant>

In reacting the above-mentioned monomer in an aqueous solvent, it is preferable to coexist an antioxidant. The coexistence of the antioxidant can improve the heat resistance of the obtained vinyl polymer microparticles. Examples of the antioxidant include hindered phenol type antioxidants, phosphorus type antioxidants, lactone type antioxidants, hydroxyamine type antioxidants, vitamin E type antioxidants and the like, among which, hindered phenol type antioxidations are preferred and pentaerythritol tetrakis[3-(3,5-di-tert-butyl-4-hydroxyphenyl)propionate] is more preferred.

Specific examples of the hindered phenol type antioxidant include pentaerythritol tetrakis[3-(3,5-di-tert-butyl-4-hydroxyphenyl)propionate] (trade name: IRGANOX (registered trademark) 1010), octadecyl 3-(3,5-di-tert-butyl-1-hydroxyphenyl)propionate, N,N'-hexane-1,6-diylbis[3-(3,5-di-tert-butyl-4-hydroxyphenyl)propionamide], benzenepropanoic acid, 3,5-bis(1,1-dimethylethyl)-4-hydroxy, C7-C9 side chain alkyl ester, 3,3',3'',5,5',5''-hexa-tert-butyl-a,a',a''-(mesitylene-2,4,6-tolyl)tri-p-cresol, calcium diethylbis[[[3,5-bis(1,1-dimethylethyl)-4-hydroxyphenyl] methyl]phosphonate], ethylenebis(oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[[(4-tert-butyl-3-hydroxy-2,6-xylyl)methyl]-1,3,5-triazine-2,4,6(1H,3H,5H)-trione, a reaction product of N-phenylbenzenamine with 2,4,4-trimethylbenzene, diethyl[[3,5-bis(1,1-dimethylethyl)-4-hydroxyphenyl]methyl]phosphonate, 2,4-dimethyl-6-(1-methylpentadecyl)phenol, octadecyl-3-(3,5-tert-butyl-4-hydroxphenyl)propionate, and 2',3-bis[3-(3,5-di-tert-butyl-4-hydroxyphenyl)propionyl]propionic acid hydrazide, and the like.

As the phosphorus type antioxidant, there are exemplified tris(2,4-di-tert-butylphenyl)phosphite (trade name: IRGAFOS) 168), tris[2-[[2,4,8,10-tetra-tert-butyldibenzo[d, f][1,3,2]dioxaphosphephin-6-yl]oxy]ethyl]amine, bis(2,4-di-tert-butylphenyl)pentaerythritol diphosphite, bis[2,4-bis(1,1-dimethylethyl)-6-methylphenyl]ethyl ester phosphorous acid, and tetrakis(2,4-di-tert-butylphenyl)[1,1-biphenyl]-4,4'-diylbisphosphonite.

Examples of the lactone type antioxidant include a reaction product of 3-hydroxy-5,7-di-tert-butyl-furan-2-one with o-xylene (CAS No, 181314-48-7). As the hydroxyamine type antioxidant, an oxidation product of alkylamine of which raw material is a reduced beef tallow and the like are exemplified. As the vitamin E type antioxidant, 3,4-dihydro-2,5,7,8-tetramethyl-2-(4,8,12-trimethyltridecyl)-2H-benzopyran-6-ol and the like are mentioned.

The amount of the antioxidant is, for example, 0.2 parts by mass or more, preferably 0.3 parts by mass or more, more preferably 0.4 parts by mass or more, and, for example, 5 parts by mass or less, preferably 3 parts by mass or less, more preferably 2 parts by mass or less, still more preferably 1 part by mass or less, with respect to 100 parts by mass of the total of monomers.

When a monomer, a polymerization initiator, an antioxidant, a solvent, and a dispersion stabilizer are dispersed and suspended, an emulsion dispersing device can be used. Examples of the emulsion dispersing device include a high-speed shearing disperser of turbine type such as Milder (manufactured by Ebara Corporation) and T. K. Homomixer (manufactured by Primix Corporation); a high-pressure jet homogenizer such as a piston-type high-pressure homogenizer (manufactured by Gaulin Corp.) and Microfluidizer (manufactured by Microfluidics Corp.); an ultrasonic type emulsion disperser such as Ultrasonic Homogenizer (manufactured by NISSEI CORPORATION); a media-agitation type disperser such as Attritor (manufactured by Mitsui Mining Co., Ltd.); and a forcible gap passage type disperser such as Colloid Mill (manufactured by NISSEI CORPORATION). Before treatment with the emulsion dispersing device, preliminary agitation may be performed with a usual paddle blade or the like.

A stirring speed during the dispersion and suspension is preferably 3000 rpm or more, more preferably 4000 rpm or more, still more preferably 4300 rpm or more, particularly preferably 4500 rpm or more, and preferably 4900 rpm or less, more preferably 4700 rpm or less, in the case of using, for example, T.K. Homomixer MARK II model 2.5 (manufactured by Primix Corporation). From the viewpoint of controlling the particle size, the stirring time is preferably 20 to 60 minutes, more preferably 25 to 40 minutes, and still more preferably 25 to 35 minutes when the T.K. homomixer MARK II model 2.5 is used. By making the stirring speed relatively low and keeping the stirring time in an appropriate range, the ratio of the number of microparticles having a particle size of 1.7 times or more and 2.5 times or less a volume average particle size can be reduced while preventing the particle size reduction (for example, the volume average particle size becoming less than 3.7 μm). In Examples of WO 2018/030461, only microparticles prepared at a stirring speed of 5000 rpm or more are described, and in any of examples, a proportion of vinyl polymer microparticles having a particle size of 1.7 times or more and 2.5 times or less a volume average particle size exceeds 0.040% on a number basis, or the volume average particle size is less than 3.7 μm.

The polymerization temperature is preferably 40 to 100° C., and more preferably 50 to 90° C. When the polymerization temperature is in the above range, decomposition of the polymerization initiator can be appropriately advanced. In addition, when a 10-hour half-life temperature of the polymerization initiator (A) is $T_A$ (° C.), the upper limit $T_R^{max}$ (° C.) of the polymerization temperature preferably satisfies the following equation: $T_R^{max}<T_A+40°$ C., more preferably satisfies the following equation: $T_R^{max}<T_A+30°$ C., and particularly preferably satisfies the following equation: $T_R^{max}<T_A+25°$ C. Furthermore, when a 10-hour half-life temperature of the polymerization initiator (B) is $T_B$(° C.), the lower limit $T_R^{min}$ (° C.) of the polymerization temperature (polymerization start temperature) preferably satisfies the following equation: $T_B-10°$ C.$<T_R^{min}$, more preferably satisfies the following equation: $T_B-5°$ C.$<T_R^{min}$, and particularly preferably satisfies the following equation: $T_B<T_R^{min}$.

The polymerization time is preferably in the range of 5 to 600 minutes, more preferably 60 to 400 minutes. When the polymerization time is within the above range, the degree of polymerization is properly increased, so that mechanical properties of the microparticles can be enhanced. The polymerization atmosphere is preferably an inert atmosphere such as nitrogen atmosphere, noble gas atmosphere, or the like.

By cooling the obtained polymerization reaction solution to 50° C. or less and performing solid-liquid separation, vinyl polymer microparticles can be recovered. As a method of solid-liquid separation, an optimum method can be selected from filtration, centrifugation, and a combination thereof, and a coagulant may be used as needed.

The recovered vinyl polymer microparticles may be suitably dried, if necessary. The drying temperature is, for example, 60° C. or more, preferably 70° C. or more, and for example, 90° C. or less. The drying is preferably carried out until the water content of the vinyl polymer microparticles is, for example, 5% by mass or less, preferably 3% by mass or less, more preferably 1% by mass or less. The drying time is, for example, 10 hours or more, preferably 12 hours or more, and for example, 20 hours or less, preferably 18 hours or less.

Further, the dried vinyl polymer microparticles may be disintegrated as required. The disintegration may be preferably performed at a temperature of 10 to 40° C. by preferably applying a pulverizing pressure of 0.1 to 0.5 MPa.

According to the above manufacturing method, in the present invention, a proportion of the vinyl polymer microparticles having a particle size of 1.7 times or more and 2.5 times or less a volume average particle size can be 0.040% or less on a number basis without classification.

3. Masterbatch.

The vinyl polymer microparticles of the present invention are compatible with the reduction of film friction and the suppression of particles dropping off from the film surface, and are useful as additives for resins, and a masterbatch containing the vinyl polymer microparticles and the resin described later is also included within the scope of the present invention. By processing the vinyl polymer microparticles into a masterbatch, it becomes easy to adjust the blending amount of the vinyl polymer microparticles in the obtained resin composition and resin film (particularly surface layer). As a result, the vinyl polymer microparticles can be more homogeneously dispersed to prevent segregation of the vinyl polymer microparticles.

As a resin to be used in the masterbatch, a resin classified into a thermoplastic resin can be used. Examples of such a thermoplastic resin include polyester resin; polyolefin resin; polyamide resin; polyurethane resin; (meth)acrylic resin; polycarbonate resin; polystyrene resin; and the like. Among these, polyolefin resin is preferable. As the polyolefin resin, there are exemplified polyethylene, polypropylene, poly(4-methylpentene), and the like, and polypropylene is preferred. The polypropylene resin mainly includes a homopolymer consisting only of polypropylene and a random polymer in which polypropylene (preferably 95% by mass or more) and a small amount of ethylene (preferably 5% by mass or less) are copolymerized. The term "polypropylene resin" used in the present invention refers to these two kinds of polymers, or general propylene resins which are copolymerized with other propylene polymers to improve the physical properties. Among them, a polypropylene resin in which the proportion of a unit derived from propylene is preferably 90% by mass or more, more preferably 95% by mass or more.

The content of the resin in the masterbatch is preferably 50% by mass or more, more preferably 70% by mass or more, still more preferably 80% by mass or more, particularly preferably 85% by mass or more, and 99% by mass or less, more preferably 95% by mass or less.

The content of the vinyl polymer microparticles in the masterbatch is preferably 0.1 parts by mass or more, more preferably 1 part by mass or more, still more preferably 5 parts by mass or more, and preferably 100 parts by mass or less, more preferably 50 parts by mass or less, still more preferably 20 parts by mass or less, particularly preferably 15 parts by mass or less, with respect to 100 parts by mass of the resin in the masterbatch.

The masterbatch of the present invention preferably further contains an antioxidant. The antioxidant can be selected from the above exemplified range and may be one or two or more kinds. Such antioxidant is preferably at least one of a hindered phenol type antioxidant or a phosphorus type antioxidant, and more preferably includes both of a hindered phenol type antioxidant and a phosphorus type antioxidant. In particular, a total of a hindered phenol type antioxidant and a phosphorus type antioxidant is preferably 80% by mass or more, more preferably 90% by mass or more, still more preferably 95% by mass or more, particularly preferably 98% by mass or more, in the antioxidant.

In addition, the hindered phenol type antioxidant in the antioxidant is contained in an amount of preferably 20 to 80% by mass, more preferably 30 to 70% by mass, still more preferably 40 to 60% by mass. The amount of the phosphorus type antioxidant in the antioxidant is preferably 20 to 80% by mass, more preferably 30 to 70% by mass, more preferably 40 to 60% by mass.

The amount of the antioxidant is preferably 0.1 parts by mass or more, more preferably 0.5 parts by mass or more, still more preferably 0.8 parts by mass or more, and preferably 7 parts by mass or less, more preferably 4 parts by mass or less, still more preferably 2 parts by mass or less, particularly preferably 1.5 parts by mass or less, with respect to 100 parts by mass of a resin in the masterbatch.

4. Microparticle-Containing Resin Film and Resin Composition

A resin film containing the vinyl polymer microparticles of the present invention and a resin (hereinafter, also referred to as "microparticle-containing resin film") is also included in the scope of the present invention. By using the vinyl polymer microparticles of the present invention, it is possible to obtain a microparticle-containing resin film in which dropping-off of vinyl polymer microparticles is suppressed even during film production or after film friction.

A resin used in the microparticle-containing resin film (hereinafter, also referred to as "matrix resin") can be selected from the range exemplified as the resin used in the masterbatch. In the case of producing the resin film after processing into a masterbatch, the matrix resin may be the same as or different from a resin used in the masterbatch.

The content of the vinyl polymer microparticles contained in the microparticle-containing resin film is preferably 0.01% by mass or more, more preferably 0.05% by mass or more, and still more preferably 0.1% by mass or more, and preferably 10% by mass or less, more preferably 5% by mass or less, still more preferably 2% by mass or less, and particularly preferably 1% by mass or less.

The thickness of the microparticle-containing resin film is preferably 0.1 μm or more, more preferably 0.5 μm or more, still more preferably 0.7 μm or more, even still more preferably 1 μm or more, and preferably 1 mm or less, more preferably 500 μm or less, still more preferably 100 μm or less, particularly preferably 50 μm or less.

A ratio of the volume average particle size of the vinyl polymer microparticles to the thickness of the particle-containing resin film (vinyl polymer microparticle size/microparticle-containing resin film thickness) is preferably 1.5 or more, more preferably 1.75 or more, and preferably 10 or less, more preferably 7 or less, still more preferably 5 or less, particularly preferably 3 or less.

The microparticle-containing resin film may be further laminated with a base film. Thus, a laminated film containing at least one layer of the microparticle-containing resin film and a base film is also included in the technical scope of the present invention. Preferably at least one layer of the microparticle-containing resin film is laminated on the base film, and more preferably, two layers thereof are laminated on the base film. The microparticle-containing resin film may be laminated on both sides or one side of the base film, and the microparticle-containing resin film is preferably laminated on both sides of the base film. In the case where the microparticle-containing resin film and the base film are laminated, the microparticle-containing resin film may be hereinafter referred to as "microparticle added skin layer" and the base film may be hereinafter referred to as "core layer" in some cases.

A resin used in the core layer is selected from the range exemplified as a resin used in the masterbatch. The resin used for the core layer (base film) may be the same as or different from the resin used for the microparticle-containing resin film and is preferably the same. The vinyl polymer microparticles may or may not be contained in the core layer (base film).

In the laminated film, a ratio of a thickness of the core layer to a thickness of the microparticle added skin layer (thickness of core layer/thickness of microparticle added skin layer) is preferably 2 or more, more preferably 5 or more, and preferably 50 or less, more preferably 30 or less, still more preferably 20 or less, particularly preferably 10 or less.

The vinyl polymer microparticles contained in the laminated film is in an amount of preferably 0.01% by mass or more, more preferably 0.05% by mass or more, and preferably 5% by mass or less, more preferably 2% by mass or less, still more preferably 1% by mass or less, particularly preferably 0.5% by mass or less.

When the microparticle-containing resin film is produced, the vinyl polymer microparticles are, directly or after processed into the above-mentioned masterbatch, mixed (preferably melted and mixed) with a resin at the above-mentioned proportion, thereby to produce a resin composition. The resin composition is molded to be able to produce a microparticle-containing resin film. In the molding, the resin composition is preferably melt-extruded, and further preferably stretched. Such melt extrusion can produce an unstretched film (cast film), and the unstretched film (cast film) is stretched to be able to produce a stretched film.

As a method of mixing the vinyl polymer microparticles with a resin and molding the resin composition, melt extrusion molding method such as a T-die method is preferable. In the case where the microparticle-containing resin film and a base film are laminated to produce a laminated film, co-extrusion may be performed. When the co-extrusion is performed, a melting temperature is in the range of preferably 180 to 240° C., more preferably 200 to 220° C.

The unstretched film (cast film) has a thickness of, for example, preferably 1 μm or more and 1 mm or less. The unstretched microparticle-containing resin film has a thickness of preferably 1 μm or more and 900 μm or less, more preferably 10 μm or more and 700 μm or less, still more preferably 15 μm or more and 500 μm or less.

When the microparticle-containing resin film (microparticles added skin layer) and the base film (core layer) are laminated, an unstretched laminated film containing these layers has a thickness of for example, preferably 100 μm or more and 1 mm or less, more preferably 200 μm or more and 500 μm or less, still more preferably 250 μm or more and 400 μm or less.

A stretching axis for stretching an unstretched film (cast film) may be uniaxial or biaxial, preferably biaxial. In the case of biaxial stretching, sequential biaxial stretching or simultaneous biaxial stretching may be performed. A stretch ratio is preferably 1 to 5 times, more preferably 2 to 4 times in both vertical and horizontal axes. It is preferable to perform the same stretching in the case where a microparticle-containing resin film (microparticles added skin layer) and a base film (core layer) are laminated.

The microparticle-containing resin film after stretching has a thickness of, for example, preferably 0.1 μm or more, more preferably 0.5 μm or more, still more preferably 0.7 μm or more, and has a thickness of preferably 50 μm or less, more preferably 20 μm or less, still more preferably 10 μm or less, even still more preferably 5 μm or less, particularly preferably 3 μm or less.

Moreover, when laminating the microparticle-containing resin film (microparticles added skin layer) and the base film (core layer), the thickness of the laminated film obtained by laminating these layers is, after stretching, 5 μm or more, more preferably 10 μm or more, still more preferably 15 μm or more, and is preferably 100 μm or less, more preferably 50 μm or less, still more preferably 30 μm or less.

Furthermore, by using the vinyl polymer microparticles of the present invention, even after rubbing the microparticle-containing resin film or the laminated film, the microparticles dropping off from the film is suppressed. For example, the drop-off rate is preferably 20% or less, more preferably 15% or less, still more preferably 12% or less. The method of measuring the drop-off rate will be described later.

Furthermore, a coefficient of static friction $\mu_s$ of the microparticle-containing resin film or the laminated film is preferably 0.5 or less, more preferably 0.3 or less, still more preferably 0.2 or less, and is preferably, for example, 0.01 or more.

In addition, a coefficient of kinetic friction $\mu_k$ of the microparticle-containing resin film or the laminated film is preferably 0.3 or less, more preferably 0.2 or less, still more preferably 0.15 or less, and is preferably, for example, 0.01 or more.

An average volume of the microparticles dropping off from the microparticle-containing resin film or the laminated film is preferably 53 $\mu m^3$ or less, more preferably 48 $\mu m^3$ or less.

The vinyl polymer microparticles of the present invention are prevented from dropping off from a film. Therefore, the vinyl polymer microparticles are useful as an anti-blocking agent for a resin film. A resin film containing the vinyl polymer microparticles of the present invention is suitably used as general packaging materials, food packaging materials such as food packaging film, and pharmaceutical packaging materials such as pharmaceutical packaging film.

EXAMPLES

Hereinafter, the present invention is described in more detail by way of examples. The present invention is, however, not limited to the following examples in any way, and it is possible to work the present invention according to the examples with an additional appropriate change within the range of the above descriptions and the following descriptions. Such a changed embodiment is also included in the technical scope of the present invention.

(1) Particle Size and Coefficient of Variation

About 0.1 g of vinyl polymer microparticles was well dispersed in 0.5 g of a surfactant ("NEOPELEX (registered trademark) G-15", sodium dodecylbenzene sulfonate, manufactured by Kao Corp.), and the dispersion was irradiated with ultrasound for 5 minutes. Then, 15 g of deionized water was added to the obtained dispersed viscous liquid. Thereafter, ultrasonic wave was applied to the mixture to prepare a vinyl polymer microparticle dispersion in a particle dispersed state. Using a precision grain size distribution measuring device ("Coulter Multisizer III" manufactured by Beckman Coulter, Inc., at an aperture of 50 μm), particle sizes of 100,000 microparticles were measured, and an average particle size on a volume basis and a coefficient of variation of the particle size were determined.

Coefficient of variation of particle size (%)=(σ/d50)×100

Here, the "σ" represents a standard deviation of the particle size on a volume basis, and the "d50" represents an average particle size (volume average particle size) on a volume basis.

(2) Proportion of Vinyl Polymer Microparticles Having a Particle Size of Times or More and 2.5 Times or Less a Volume Average Particle Size Using a flow type particle image analyzer ("FPIA-3000 (registered trademark)": Sysmex Corporation), particle size distribution data on a number basis was obtained for 1 million vinyl polymer microparticles as a measurement target. Based on the particle size distribution data, all the shapes were checked in the image, and the shapes of all the microparticles having a particle size of 1.7 times or more and 2.5 times or less a volume average particle size obtained in the above (1) were checked, and the number of vinyl polymer microparticles having a circularity of 0.95 or more was counted. In addition, since particles having a circularity of less than 0.95 are agglomerated particles, they were not counted as coarse particles even with a predetermined particle size. This measurement was repeated four times, and the average value was defined as the number of vinyl polymer microparticles having a particle size of 1.7 times or more and 2.5 times or less a volume average particle size on a number basis. The percentage determined by dividing the above average value by 1,000,000 was taken as a proportion on a number basis of the vinyl polymer microparticles having a particle size of 1.7 times or more and 2.5 times or less a volume average particle size. In the above measurement, HPF (high magnification imaging) mode/quantitative counting method (total count number 250,000, repeated measurement number 1) was set as a measurement condition of flow type particle image analyzer ("FPIA-3000 (registered trademark)") in such a manner that 17.5 parts of a 1.4% by mass aqueous surfactant solution (NEOPEREX (registered trademark) G-15 (sodium dodecylbenzene sulfonate) manufactured by Kao Corporation) were added to the dispersion (0.05 parts in terms of particles) or 0.05 parts of the particle powder, and the mixture was dispersed by ultrasonic wave for 10 minutes.

(3) Measurement of Coefficient of Friction (COF)

A smoother surface side of a laminated resin film (biaxially stretched polypropylene film (BOPP)) after biaxial stretching was used as a measurement surface, and an autograph AG-K manufactured by Shimadzu Corporation was used as a friction coefficient measuring device. As jigs for measuring the coefficient of friction, a load cell having a capacity of 50 N, a specialized base (200 mm in width×355 min in length) for measuring friction coefficient, and a moving weight (size: 63.5 mm in width×63.5 mm in length× 6.4 mm in thickness, mass of 200 g) were used.

Two sheets (one set) of laminated resin films after biaxial stretching were prepared, and their peripheral portions were cut. Then, a sample film of 12 cm×18 cm and a sample film of 12 cm×12 cm were cut out respectively. Then, the cut-out film of 12 cm×18 cm was fixed to the measurement base with the roll surface facing upward and serving as the frictional resistance measurement surface, and four corners of the sample were secured with a cellophane tape. The moving weight was wrapped with the cut-out film of 12 cm×12 cm so that the roll face side comes outward and fixed to the weight with a cellophane tape.

The moving weight wrapped with the sample (film) was placed on the sample (film) on the measurement base, and the moving weight was repeatedly slid in the same direction using a crosshead (speed: 150 mm/min; travel distance per sliding: 100 mm). The travel resistance generated by the friction during this sliding was measured, and a coefficient of static friction $\mu_s$ and a coefficient of kinetic friction $\mu_k$ were determined as follows.

Coefficient of static friction $\mu_s$=Maximum tensile test force at the start of moving weight/(Mass of moving weight×gravitational acceleration)

Coefficient of kinetic friction $\mu_k$=Average tensile test force during travel of moving weight/(Mass of moving weight×gravitational acceleration)

The travel distances 100 mm and the distance to determine the coefficient of kinetic friction was in the range of 30 mm to 90 mm from the travel start point. The weight was allowed to continuously travel four times to measure a coefficient of static friction $\mu_s$ and a coefficient of kinetic friction $\mu_k$ each time. And an average value of four times was determined as the coefficient of static friction $\mu_s$ and the coefficient of kinetic friction $\mu_k$.

(4) Number of Drop-off particles

The surface of the obtained film sample after friction test was observed (secondary electronic image) at an acceleration voltage of 5 kV using an SEM (scanning electron microscope) VK-8500 (manufactured by Keyence Corporation).

For each film sample, 19 sheets of an area of 270 μm×200 μm were photographed at a 500×field of view, and a total area of 1 mm² was photographed. The number of particles (the number of protrusions derived from vinyl polymer microparticles) and the number of drop-off particles (traces of drop-off particles) contained in each photographed image were counted, and a drop-off rate was determined based on the following equation.

Drop-off rate (%)=Number of drop-off particles/ Number of particles+Number of drop-off particles)

(5) Measurement of Volume of Drop-Off Particles

Except for setting the number of travels of a weight to 20 times, the weight wrapped with a film was run on a film fixed to a measurement base in the same manner as in the measurement of the coefficient of kinetic friction $\mu_k$. After that, drop-off particles adhering to the friction surface of a sample (film) fixed to the moving weight and the friction surface of the sample (film) set on the measurement base were washed away with methanol, and methanol was concentrated to dryness to collect the drop-off particles in methanol. The collected drop-off particles were observed by SEM (scanning electron microscope, VK-8500 (manufactured by Keyence Corporation)), and a particle size of the observed particles was measured using a caliper. In order to ensure the reliability of the measurement values, 300 or more drop-off particles were measured. A particle size of one drop-off particle was measured, and a particle volume of the drop-off particle was determined using the following equation. Then, after determining a particle volume of each drop-off particle for the number of "observation number" described in Table 1, all the particle volumes for the number of "observation number" were totaled to obtain a total volume of drop-off particles. Furthermore, a particle volume per drop-off particle was calculated by dividing the total volume of the drop-off particles by the number of the drop-off particles (the "observation number" described above).

Particle volume=(4/3)×π×(particle radius)³

(6) Residual Amount of (Meth)acrylic Monomer in Vinyl Polymer Microparticles (Residual Amount of Methyl Methacrylate (MMA) in Vinyl Polymer Microparticle)

About 0.2 g of vinyl polymer microparticles and 0.015 g of butylbenzene (internal standard) were mixed with 10 g of acetonitrile, and the remaining methyl methacrylate (MMA) was extracted by stirring for 2 hours or more. Thereafter, the extract was filtered with a filter having a pore diameter of 0.45 μm or less, and the amount of methyl methacrylate (MMA) in the filtrate was determined by gas chromatography using a calibration curve method, so that the amount of methyl methacrylate (MMA) in the vinyl polymer microparticles was determined. The gas chromatography conditions were as follows.

Device: "GC-2014" manufactured by Shimadzu Corporation

Column: DB-5MS (manufactured by J&W Scientific Inc.) 30 m in length, column diameter 0.53 mm, liquid phase film thickness 1.50 μm Vaporization chamber temperature: 280° C.

Detector temperature: 320° C.

Injection volume: 0.5 μL.

Carrier gas (helium): Total flow 10 mL/min, purge flow 3.0 mL/min

Column temperature program: kept at 50° C. (5 minutes from the start)→temperature rise at 2° C./min (up to 60° C.)→temperature rise at 10° C./min (up to 150° C.)→kept at 150° C. (for 3 minutes)→temperature rise at 2° C./min (up to 164° C.)→temperature rise at 20° C./min (up to 300° C.)→kept at 300° C. (for 25 minutes)

Retention time of MMA: about 3.5 minutes (7) Hydrophobicity of Microparticles

A glass container having a cross-sectional area of 5 cm² or more and 10 cm² or less was prepared, then filled with 20 mL of deionized water having a liquid temperature of 20° C. that was adjusted using a constant temperature bath. Vinyl polymer microparticles are gently floated on the water surface, and the time taken for the first particle to start sedimentation is determined to be a sedimentation start time. The hydrophobicity of microparticles was evaluated according to the following criteria A: The sedimentation time is 16 seconds or more.

B: The sedimentation time is less than 16 seconds.

Example 1

<Preparation of Vinyl Polymer Microparticles>

A flask equipped with a stirrer, an inert gas inlet tube, a reflux condenser, and a thermometer was charged with 523 parts by mass of deionized water in which 1.8 parts by mass (0.5% by mass with respect to the monomer described below) of a polyoxyethylene distyryl phenyl ether sulfate ammonium salt (trade name "HITENOL (registered trademark) NF-08", manufactured by Dai-ichi Kogyo Seiyaku Co., Ltd.) had been dissolved. The flask was then charged with the following components prepared in advance: 288 parts by mass of methyl methacrylate (MMA) and 72 parts by mass of ethylene glycol dimethacrylate (EGDMA) as a monomer, 6.84 parts by mass (1.9 parts by mass with respect to the mass of the monomer) of lauryl peroxide (product name: "PEROYL L", manufactured by NOF Corporation) (alias name: dilauroyl peroxide) (abbreviated as LPO) as a polymerization initiator (B), 3.6 parts by mass (1.0% by mass with respect to the mass of the monomer) of t-hexylperoxy-2-ethylhexanoate (trade name "PERHEXYL O", manufactured by NOF Corporation) (abbreviated as PHO) as a polymerization initiator (A), and 1.8 parts by mass (0.5% by mass with respect to the monomer) of a hindered phenol antioxidant (manufactured by BASF Japan, trade name "IRGANOX (registered trademark) 1010", pentaerythritol tetrakis[3-(3,5-di-tert-butyl-4-hydroxyphenyl) propionate]) as an antioxidant. The charged mixture was stirred at 4700 rpm for 30 minutes using a T. K. Homo Mixer model 2.5 (manufactured by Primix Corporation), to give a homogeneous suspension.

Into the monomer suspension, 900 parts by mass of deionized water was added. The mixture was transferred to a polymerization vessel filled with nitrogen gas, and heated until the reaction solution reached 65° C. while blowing nitrogen gas. The reaction container was kept at 65° C., and the reaction start time was determined at a time when the liquid temperature reached a peak temperature (about 80° C.) by self-heating. Stirring was continued for 1.5 hours while keeping the reaction solution at 75° C. (when the amount of the polymerization initiator is large, the jacket temperature is appropriately adjusted so that the peak temperature does not exceed 85° C.). Thereafter, the polymerization solution was further heated to 85° C. and stirred for 4 hours to complete the polymerization reaction. Then, the reaction solution (suspension) was cooled to 50° C. or less and filtered to collect a polymerization product. The polymerization product was dried at 85° C. for 14 hours using a hot air drier (manufactured by Yamato Scientific Co., Ltd.) to obtain vinyl polymer microparticles.

Since the dried vinyl polymer microparticles thus obtained were agglomerated due to drying, the agglomerate was pulverized under a pulverization pressure of 0.3 MPa at a normal temperature using Super Jet Mill SJ-500 (manufactured by Nissin Engineering Inc.), thereby to obtain vinyl polymer microparticles.

<Preparation of Film>

Ten parts of the vinyl polymer microparticles thus produced, 90 parts of pellets of polypropylene (NOVATEC (registered trademark) FY4 manufactured by Japan Polypropylene Corporation), and 0.5 parts of IRGANOX (registered trademark) 1010 and 0.5 parts of IRGAFOS (registered trademark) 168 manufactured by BASF Japan as antioxidants were mixed using a same-direction rotating biaxial extruder (HK-25D) manufactured by Parker Corporation. The mixture was melted and kneaded at 212° C. and then cooled with water to give a strand. The strand was appropriately cut to prepare a polypropylene masterbatch including 10% of vinyl polymer microparticles.

Using the polypropylene masterbatch thus obtained and polypropylene pellets, a three-layered cast film composed of two kinds of materials was prepared. A structure which laminates a surface layer on both surfaces of a base film was adopted. A T-die extruder (manufactured by Souken Co., Ltd.) was used for the film preparation. In the surface layer of the two layers, 1 part by mass of a masterbatch containing 10% of vinyl polymer microparticles, and 9 parts by mass of polypropylene pellets were used, and 180 parts of polypropylene pellets alone were used as a base film. In the cast film, the average thickness of the two surface layers was 16 μm, the average thickness of the base film was 288 μm, and the total average thickness of the two surface layers and the base film was 320 μm.

The cast film thus obtained was cut into a piece having a length of 9 cm and a width of 9 cm. The cut film piece was subjected to simultaneous biaxial stretching under heating conditions of 165° C. with a stretch ratio set to 3 times in longitudinal and lateral directions using a simultaneous biaxial stretching machine (manufactured by Toyo Seiki Co., Ltd.). The obtained film had a size of 22 cm×22 cm. The center portion of the stretched film had a thickness of about 20 μm, while the film end portion had a thickness of about 100 μm, and a central 12 cm square of the stretched film was cut out.

The average thickness of the entire film was calculated by further cutting out a central 10 cm square of the cut film, measuring the thickness 3 times or more with a micrometer (MDC-25M manufactured by Mitutoyo Corporation), and calculating the average value. In addition, each average thickness of the surface layer and the base film was calculated by embedding the film in an epoxy resin, polishing the resin so that the cross section of the film is exposed to the surface, observing the cross section by an SEM (scanning electron microscope), measuring the thickness of the film at equally three-divided positions, and averaging the measured values. The total thickness of the film was 20 μm, the average thickness of each of the two surface layers was 1 μm, and the average thickness of the base film was 18 μm.

In addition, the film formed from the T-die extrusion molding machine is obtained by winding up when producing a cast film. A side to be in contact with a winding roll is called a roll surface, and the other side is called an air surface. In general, crystal growth of the polypropylene can be suppressed on the roll surface side because of high cooling speed, so that the completed roll surface side of the cast film is smooth. On the other hand, crystal growth of the polypropylene easily occurs on the air surface side, so that micro unevenness is present compared to the roll surface side.

Various physical properties of the vinyl polymer microparticles and the film are shown in Table 1.

Comparative Example 1

Vinyl polymer microparticles and a film were produced in the same manner as in Example 1 except that the stirring was performed at 5500 rpm for 10 minutes. Table 1 shows various physical properties of the vinyl polymer microparticles and the film.

Example 2

Vinyl polymer microparticles and a film were produced in the same manner as in Example 1 except that the stirring was performed at 4500 rpm for 30 minutes, Table 1 shows various physical properties of the vinyl polymer microparticles and the film.

Comparative Example 2

Vinyl polymer microparticles and a film were produced in the same manner as in Example 1 except that the stirring was performed at 5000 rpm for 10 minutes. Table 1 shows various physical properties of the vinyl polymer microparticles and the film.

Comparative Example 3

Vinyl polymer microparticles and a film were produced in the same manner as in Example 1 except that the amount of polyoxyethylene distyryl phenyl ether sulfate ammonium salt (trade name "HITENOL (registered trademark) NF-08", manufactured by Dai-ichi Kogyo Seiyaku. Co., Ltd.) was changed to 3.6 parts by mass (1.0% by mass with respect to the mass of the monomer), the amount of the polymerization initiator (A) was changed to 0 part by mass (without charging the polymerization initiator (A)), the amount of LPO as the polymerization initiator (B) was changed to 3.6 parts by mass (1.0% by mass with respect to the mass of the monomer), and the stirring was performed at 5500 rpm for 40 minutes. Table 1 shows various physical properties of the vinyl polymer microparticles and the film.

Comparative Example 4

Vinyl polymer microparticles and a film were produced in the same manner as in Comparative Example 3 except that the stirring was performed at 5700 rpm. Table 1 shows various physical properties of the vinyl polymer microparticles and the film.

Comparative Example 5

Vinyl polymer microparticles were produced in the same manner as in Example 1 except that the stirring was carried out at 5650 rpm for 10 minutes, and after stirring, classification was performed using a Micro Separator (registered trademark) MS-1H (manufactured by Hosokawa Micron Corporation) under the conditions of a classification rotation speed 3500 rpm, an air volume 15 m³/min, and a coarse powder cut rate 13%. The vinyl polymer microparticles of Comparative Example 5 had a volume average particle size of 3.65 μm, and a proportion of vinyl polymer microparticles having a particle size of 1.7 times or more and 2.5 times or less a volume average particle size on a number basis was 0.123%, and a coefficient of variation of particle sizes was 35.3% on a volume basis. In addition, when stirring is performed at 5650 rpm for 10 minutes (at the time before classification), the volume average particle size was 3.71 μm; the proportion of vinyl polymer microparticles having a particle size of 1.7 times or more and 2.5 times or less a volume average particle size on a number basis was 0.142%; and the coefficient of variation of particle sizes was 36.2% on a volume basis.

TABLE 1

| | Stirrer | | Microparticles | | | | | | Number of Drop-off Particles | | |
|---|---|---|---|---|---|---|---|---|---|---|---|
| | Rotation speed rpm | Rotation time min | Volume average particle size(D) μm | Coefficient of variation % | Particle size of 1.7 times a volume average particle size (A) μm | Particle size of 2.5 times a volume average particle size (B) μm | Number of particles (C) having a particle size of (A) – (B) number | Proportion of particles having a particle size of (A) – (B) % | Total number of particles number | Drop-off number of particles number | Drop-off rate % |
| Example 1 | 4700 | 30 | 3.92 | 34.8 | 6.66 | 9.80 | 64 | 0.006 | 460 | 51 | 11.1 |
| Example 2 | 4500 | 30 | 5.04 | 36.7 | 8.57 | 12.60 | 224 | 0.022 | 328 | 46 | 14.0 |
| Comparative Example 1 | 5500 | 10 | 4.01 | 39.8 | 6.82 | 10.03 | 565 | 0.057 | 556 | 59 | 10.6 |
| Comparative Example 2 | 5000 | 10 | 4.76 | 37.4 | 8.09 | 11.90 | 424 | 0.042 | 406 | 50 | 12.3 |
| Comparative Example 3 | 5500 | 40 | 3.58 | 36.5 | 6.09 | 8.95 | 243 | 0.024 | 1161 | 118 | 10.2 |
| Comparative Example 4 | 5700 | 40 | 3.22 | 34.7 | 5.47 | 8.05 | 348 | 0.035 | 977 | 85 | 8.7 |

| | Volume of Drop-off Particles | | | Coefficient of friction | | Characteristics of Microparticles | | | |
|---|---|---|---|---|---|---|---|---|---|
| | Observation number number | Total volume of drop-off particles μm³ | Average volume per particles (V) μm³ | Coefficient of static friction | Coefficient of kinetic friction | Residual amount of MMA ppm | Hydro-phobicity | (C)/(D) number/μm | (C)/(V) number/μm³ |
| Example 1 | 331 | 13009 | 39 | 0.16 | 0.09 | 36 | A | 16 | 1.6 |
| Example 2 | 342 | 16389 | 48 | 0.17 | 0.09 | 30 | A | 44 | 4.7 |
| Comparative Example 1 | 439 | 24154 | 55 | 0.16 | 0.08 | 27 | A | 141 | 10.3 |
| Comparative Example 2 | 580 | 35392 | 61 | 0.17 | 0.08 | 19 | A | 89 | 6.9 |
| Comparative Example 3 | 336 | 8087 | 24 | 0.17 | 0.10 | 909 | B | 68 | 10.1 |
| Comparative Example 4 | 325 | 5814 | 18 | 0.16 | 0.09 | 708 | B | 108 | 19.5 |

As is apparent from Table 1, by adjusting a proportion of vinyl polymer microparticles having a particle size of 1.7 times or more and 2.5 times or less a volume average particle size on a number basis to 0.040% or less, as well as by adjusting a volume average particle size to 3.7 μm or more, it was possible to reduce an average volume of the microparticles dropping off from a film surface while reducing film friction. In addition, appearance of the film could be improved.

The invention claimed is:
1. Vinyl polymer microparticles that satisfy the following (1) to (3):
   (1) a coefficient of variation of particle sizes is 30% or more on a volume basis;
   (2) a proportion of vinyl polymer microparticles having a particle size of 1.7 times or more and 2.5 times or less a volume average particle size is 0.040% or less on a number basis; and

(3) a volume average particle size is 3.7 µm or more, wherein the vinyl polymer microparticles comprise a copolymer of a (meth)acrylic monofunctional monomer and a (meth)acrylic difunctional crosslinkable monomer.

2. The vinyl polymer microparticles according to claim 1, wherein the (meth)acrylic monofunctional monomer is a $C_{1-4}$ alkyl(meth)acrylate, and the (meth)acrylic difunctional crosslinkable monomer is an alkanediol di(meth)acrylate.

3. The vinyl polymer microparticles according to claim 1, wherein a residual amount of a (meth)acrylic monomer is 700 ppm or less.

4. A masterbatch comprising the vinyl polymer microparticles according to claim 1 and a resin.

5. The masterbatch according to claim 4, wherein the resin is a polyolefin resin.

6. A resin film comprising the vinyl polymer microparticles according to claim 1 and a resin.

7. The resin film according to claim 6, wherein a content of the vinyl polymer microparticles is 0.01% by mass or more and 10% by mass or less.

8. The resin film according to claim 6, wherein the resin film has a thickness of 0.1 µm or more and 1 mm or less.

* * * * *